United States Patent
Master

(10) Patent No.: US 12,367,887 B2
(45) Date of Patent: Jul. 22, 2025

(54) SEPARATION OF PANNED SOURCES FROM GENERALIZED STEREO BACKGROUNDS USING MINIMAL TRAINING

(71) Applicant: DOLBY LABORATORIES LICENSING CORPORATION, San Francisco, CA (US)

(72) Inventor: Aaron Steven Master, San Francisco, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 284 days.

(21) Appl. No.: 18/009,651

(22) PCT Filed: Jun. 11, 2021

(86) PCT No.: PCT/US2021/037034
§ 371 (c)(1),
(2) Date: Dec. 9, 2022

(87) PCT Pub. No.: WO2021/252912
PCT Pub. Date: Dec. 16, 2021

(65) Prior Publication Data
US 2023/0245664 A1    Aug. 3, 2023

Related U.S. Application Data

(60) Provisional application No. 63/038,046, filed on Jun. 11, 2020.

(30) Foreign Application Priority Data

Jun. 11, 2020  (EP) ..................................... 20179449

(51) Int. Cl.
*G10L 19/02*    (2013.01)
*G06F 3/16*    (2006.01)
(Continued)

(52) U.S. Cl.
CPC .............. *G10L 19/02* (2013.01); *G06F 3/165* (2013.01); *G10L 25/21* (2013.01); *H04S 7/30* (2013.01); *H04S 2400/11* (2013.01)

(58) Field of Classification Search
CPC ........ G06F 16/683; G06F 16/68; G06F 17/00; G06F 16/635
(Continued)

(56) References Cited

U.S. PATENT DOCUMENTS 7,454,333 B2    11/2008  Ramakrishnan
7,912,232 B2    3/2011  Master
(Continued)

FOREIGN PATENT DOCUMENTS

JP    2006349840 A    12/2006
JP    2009218663 A    9/2009
(Continued)

OTHER PUBLICATIONS

Guo, Haiyan et al; "Single-Channel Speaker Separation Based on Sub-Spectrum GMM and Bayesian Theory"; ICSP2008 Proceedings; pp. 701-704.
(Continued)

*Primary Examiner* — Alexander Krzystan

(57) ABSTRACT

In an embodiment, a spatio-level filter (SLF) is created by obtaining a first set of samples from a plurality of target source level and spatial distributions in frequency subbands in a frequency domain, obtaining a second set of samples from a plurality of background level and spatial distributions in frequency subbands in a frequency domain, adding the first and second sets of samples to create a combined set of samples, detecting level and spatial parameters for each sample in the combined set of samples for each subband, within subbands, weighting the detected level and spatial parameters by their respective level and spatial distributions (Continued)

for the target source and backgrounds; storing the weighted level, spatial parameters and signal-to-noise ratio (SNR) within subbands for each sample in the combined set of samples in a table; and re-indexing the table by the weighted level and spatial parameters and subband.

10 Claims, 6 Drawing Sheets

(51) Int. Cl.
*G10L 25/21* (2013.01)
*H04S 7/00* (2006.01)
(58) Field of Classification Search
USPC .......................................................... 700/94
See application file for complete search history.

(56) References Cited

U.S. PATENT DOCUMENTS

| | | | |
|---|---|---|---|
| 7,970,144 | B1 | 6/2011 | Avendano |
| 8,027,478 | B2 | 9/2011 | Barry |
| 8,280,077 | B2 | 10/2012 | Avendano |
| 8,812,322 | B2 | 8/2014 | Mysore |
| 9,564,144 | B2 | 2/2017 | Nesta |
| 10,049,678 | B2 | 8/2018 | Nesta |
| 10,433,075 | B2 | 10/2019 | Crow |
| 2007/0076902 | A1 | 4/2007 | Master |
| 2009/0238371 | A1 | 9/2009 | Rumsey |
| 2012/0128164 | A1* | 5/2012 | Blamey ................ H04R 25/407 381/28 |
| 2015/0071446 | A1 | 3/2015 | Sun |
| 2016/0261961 | A1* | 9/2016 | Andersen ............... H04R 25/50 |
| 2017/0206907 | A1 | 7/2017 | Wang |
| 2018/0144759 | A1 | 5/2018 | Lu |
| 2019/0098399 | A1 | 3/2019 | Lashkari |
| 2020/0075030 | A1 | 3/2020 | Tsilfidis |
| 2020/0143819 | A1 | 5/2020 | Delcroix |
| 2020/0191913 | A1* | 6/2020 | Zhang .................... G01S 7/412 |
| 2022/0408180 | A1* | 12/2022 | Lepoutre ................. G01S 5/20 |
| 2023/0245671 | A1* | 8/2023 | Master ................ G10L 21/0272 704/205 |
| 2023/0333201 | A1* | 10/2023 | Regani .................... G01S 13/86 |
| 2023/0335141 | A1* | 10/2023 | Pihlajakuja ........... G10L 19/032 |

FOREIGN PATENT DOCUMENTS

| | | |
|---|---|---|
| JP | 2018031910 A | 3/2018 |
| KR | 20140042900 A | 4/2014 |
| RU | 2596592 C2 | 9/2016 |
| RU | 2640742 C1 | 1/2018 |
| RU | 2673390 C1 | 11/2018 |
| WO | 2017141542 A1 | 8/2017 |
| WO | 2019193070 A1 | 10/2019 |

OTHER PUBLICATIONS

Itakura, Kousuke et al.; "Bayesian Multichannel Nonnegative Matrix Factorization for Audio Source Separation and Localization"; Graduate School of Informatics; Kyoto University; Sakyo-ku, Kyoto 606-8501; Japan; ICASSP 2017; pp. 551-555.

Itakura, Kousuke et al.; "Bayesian Multichannel Audio Source Separation Based on Integrated Source and Spatial Models"; IEEE/ACM Transactions on Audio, Speech, and Language Processing; vol. 26; No. 4; Apr. 2018; pp. 831-846.

Master, Steven A., Stereo Music Source Separation via Bayesian Modeling, Doctoral thesis, Stanford University, http://citeseerx.ist.psu.edu/viewdoc/download?doi=10.1.1.81.7477&rep=repl&type=pdf.

Ozerov, Alexey et al.; "Adaption of Bayesian Models for Single Channel Source Separation and its Application to Voice/Music Separation in Popular Songs"; IEEE Transactions on Audio, Speech and Language Processing; Institute of Electrical and Electronics Engineers; 2007; 15(5); pp. 1564-1578.

Sekiguchi, Kouhei et al.; "Bayesian Multichannel Speech Enhancement with a Deep Speech Prior"; Proceedings, APSIPA Annual Summit and Conference 2018; Nov. 12-15, 2018; Hawaii; pp. 1233-1239.

Wang, Wenwu et al.; "Video Assisted Speech Source Separation"; ICASSP 2005; pp. V-425-V-428.

Xu, Tao et al.; "Methods for Learning Adaptive Dictionary in Underdetermined Speech Separation"; Machine Learning for Signal Processing (MLSP); 2011 IEEE International Workshop ON, IEEE; Sep. 18, 2011; pp. 1-6.

\* cited by examiner

SEPARATION OF PANNED SOURCES FROM GENERALIZED STEREO BACKGROUNDS USING MINIMAL TRAINING

CROSS-REFERENCE TO RELATED APPLICATIONS

This application is a National Phase entry of PCT Patent Application No. PCT/US2021/037034, having international filing date of Jun. 11, 2021, which claims the benefit of priority from U.S. Provisional patent application 63/038,046, filed on 11 Jun. 2020, and EP patent application No. 20179449.2, filed on 11 Jun. 2020, which are hereby incorporated by reference.

TECHNICAL FIELD

This disclosure relates generally to audio signal processing, and in particular to audio source separation techniques.

BACKGROUND

Two-channel audio mixes (e.g., stereo mixes) are created by mixing multiple audio sources together. There are several examples where it is desirable to detect and extract the individual audio sources from two-channel mixes, including but not limited to: remixing applications, where the audio sources are relocated in the two-channel mix, upmixing applications, where the audio sources are located or relocated in a surround sound mix, and audio source enhancement applications, where certain audio sources (e.g., speech/dialog) are boosted and added back to the two-channel or a surround sound mix.

SUMMARY

The details of the disclosed implementations are set forth in the accompanying drawings and the description below. Other features, objects and advantages are apparent from the description, drawings and claims.

In an embodiment, a method comprises: obtaining, using one or more processors, a frequency domain representation of a first set of samples from a plurality of target source level and spatial distributions in a plurality of frequency subbands; obtaining, using the one or more processors, a frequency domain representation of a second set of samples from a plurality of background level and spatial distributions in the plurality of frequency subbands; adding, using the one or more processors, the first and second sets of samples to create a combined set of samples; detecting, using the one or more processors, level and spatial parameters for each sample in the combined set of samples for each subband in the plurality of frequency subbands; within each subband of the plurality of frequency subbands, weighting the detected level and spatial parameters by their respective level and spatial distributions for the target source and backgrounds; storing, using the one or more processors, the weighted level, spatial parameters and signal-to-noise ratio (SNR) within the plurality of frequency subbands for each sample in the combined set of samples in a table; and re-indexing, using the one or more processors, the table by the weighted level parameters, spatial parameters, and subband, such that the table includes a target percentile SNR of the weighted level and spatial parameters and subband, and that for a given input of quantized detected spatial and level parameters and subband, an estimated SNR associated with the quantized detected spatial and level parameters and subband is obtained from the table.

In an embodiment, the method further comprises smoothing data that is indexed on one or more of the detected level, one or more of the spatial parameters or frequency subband.

In an embodiment, the frequency domain representation is a short-time Fourier transform (STFT) domain representation.

In an embodiment, the spatial parameters include panning and a phase difference between two channels of a mixed audio signal.

In an embodiment, the target source is amplitude panned using a constant power law.

In an embodiment, the target percentile SNR is the 25th percentile.

In an embodiment, a method comprises: transforming, using one or more processors, one or more frames of a two-channel time domain audio signal into a time-frequency domain representation including a plurality of time-frequency tiles, wherein the frequency domain of the time-frequency domain representation includes a plurality of frequency bins grouped into a plurality of subbands; for each time-frequency tile: calculating, using the one or more processors, spatial parameters and a level for the time-frequency tile; generating, using the one or more processors, a percentile signal-to-noise ratio (SNR) for each frequency bin in the time-frequency tile; generating, using the one or more processors, a fractional value for the bin based on the SNR for the bin; and applying, using the one or more processors, the fractional values for the bins in the time-frequency tile to generate a modified time-frequency tile of an estimated audio source.

In an embodiment, a plurality frames of the time-frequency tiles are assembled into a plurality of chunks, each chunk including a plurality of subbands, the method comprising: for each subband in each chunk: calculating, using the one or more processors, spatial parameters and a level for each time-frequency tile in the chunk; generating, using the one or more processors, a percentile signal-to-noise ratio (SNR) for each frequency bin in the time-frequency tile; generating, using the one or more processors, a fractional value for the bin based on the SNR for the bin; and applying, using the one or more processors, the fractional values for the bins in the time-frequency tile to generate a modified time-frequency tile of an estimated audio source.

In an embodiment, the method includes transforming, using the one or more processors, the modified time-frequency tile into a plurality of time domain audio source signals.

In an embodiment, the spatial parameters include panning and phase difference between channels for each of the time-frequency tiles.

In an embodiment, the fractional values are obtained from a lookup table or function for a Spatio-Level Filter (SLF) system trained for a panned target source.

In an embodiment, transforming one or more frames of a two-channel time domain audio signal into a frequency domain signal comprises applying a short-time frequency transform (STFT) to the two-channel time domain audio signal.

In an embodiment, multiple frequency bins are grouped into octave subbands or approximately octave subbands.

Particular embodiments disclosed herein provide one or more of the following advantages. The disclosed embodiments allow for the extraction (source separation) of a target source from a recording of a mix that consists of the source plus some backgrounds. More specifically, the disclosed embodiments allow the extraction of a source that is mixed (purely or mostly) using amplitude panning, which is the most common way that dialog is mixed in TV and movies. Being able to extract such sources enables dialog enhancement (which extracts and then boosts dialog in a mix) or upmixing. Additionally, a high quality estimate of the source may be extracted with almost no training data or latency, a feature that makes it distinct from most other approaches to source separation.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

DETAILED DESCRIPTION

Signal Model and Assumptions

Figure 1:
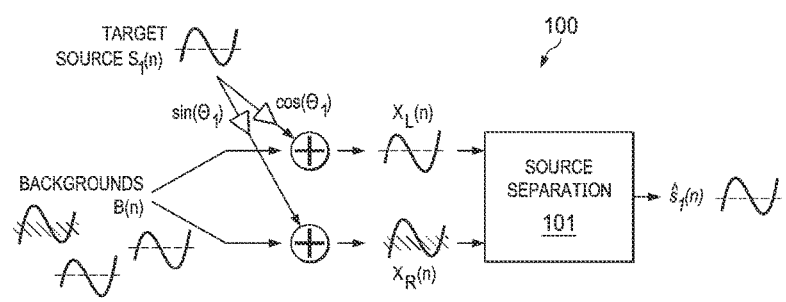
FIG. 1 illustrates a signal model for source separation depicting time domain mixing, in accordance with an embodiment.

FIG. 1 illustrates signal model 100 for source separation depicting time domain mixing, in accordance with an embodiment. Signal model 100 assumes basic time domain mixing of a target source, $s_1$, and backgrounds, b, into two channels, hereinafter referred to as "left channel" ($x_1$ or $X_L$) and "right channel" ($x_2$ or $X_R$) depending on the context. The two-channels are input in source separation system 101 which estimates $\hat{S}_1$.

The target source, $s_1$ is assumed to be amplitude panned using a constant power law. Since other panning laws can be converted to the constant power law, the use of a constant power law in signal model 100 is not limiting. Under constant power law panning, the source, $s_1$, mixing to left/right (L/R) channels is described as follows:

$$x_1 = \cos(\Theta_1) s_1, \quad [1]$$

$$x_2 = \sin(\Theta_1) s_1, \quad [2]$$

where $\Theta_1$ ranges from 0 (source panned far left) to $\pi/2$ (source panned far right). This can be expressed in the Short Time Fourier Transform (STFT) domain as $$X_L = \cos(\Theta_1) S_1, \quad [3]$$

$$X_R = \sin(\Theta_1) S_1. \quad [4]$$

Continuing in the STFT domain, the addition of backgrounds, B, to each channel is expressed as:

$$X_L = \cos(\Theta_1) S_1 + \cos(\Theta_B) |B| e^{j\angle B}, \quad [5]$$

$$X_R = \sin(\Theta_1) S_1 + \sin(\Theta_B) |B| e^{j\angle B + \varphi_B}. \quad [6]$$

The backgrounds, B, have included additional parameters $\angle B$ and $\varphi_B$. These parameters respectively describe the phase difference between $S_1$ and the left channel phase of B, and the interchannel phase difference between the phase of B in the left and right channels in STFT space. Note that there is no need to include a $\varphi_{S1}$ parameter in Equations [5] and [6] because the interchannel phase difference for a panned source is by definition zero. The target $S_1$ and backgrounds B are assumed to share no particular phase relationship in STFT space, so the distribution on $\angle B$ is modeled as uniform.

There are key spatial differences between the target source and backgrounds. Spatially, $\Theta_1$ is treated as a specific single value (the "panning parameter" for the target source $S_1$), but $\Theta_B$ and $\Phi_B$ each have a statistical distribution, which allows the use of a statistical model (e.g., a Bayesian model) to perform source separation.

To review then, the "target source" is assumed to be panned meaning it can be characterized by $\Theta_1$. The interchannel phase difference for the target source is assumed to be zero. There is also a distribution on its level $L_S = |S_1|$, which is assumed to be known at least over roughly-octave subbands. The spatial information is assumed to be totally specified by the panning parameter of the source.

The backgrounds, B, are characterized as having a distribution on $\Theta_B$ and also on interchannel phase difference $\varphi_B$. There is also a distribution on the background level $L_B = |B|$ which we shall assume is known at least over roughly-octave subbands.

For purposes of this model, the source and backgrounds shall only be modeled at points in time where both are assumed to be "active." In this sense, the source and background for present purposes are assumed to always be "on" or "off," and the separation shall assume that both target source and background are "on." It can be shown that if the target source is active but backgrounds are not, the extraction will still be nearly perfect. If target source and panning parameters are not known, they may be estimated using techniques known to those skilled in the art. For some cases, such as most music, there may be a harmonic relationship between target source and backgrounds. Such relationships are not separately modeled in signal model 100; the distributions are assumed to include some degree of overlap of harmonics as is appropriate for a given application

Training Process

Figure 2:
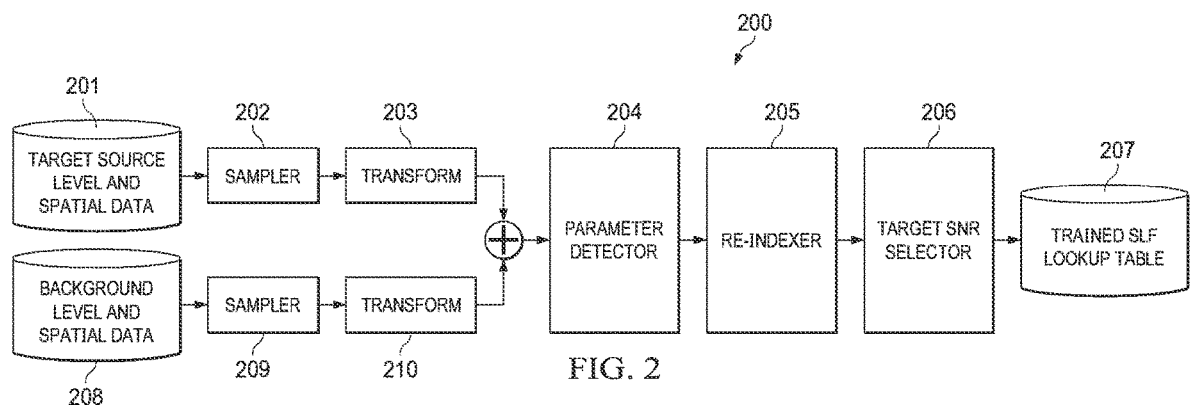
FIG. 2 is a block diagram of a system to generate a Spatio-Level Filter (SLF) look-up table trained to extract panned sources, according to an embodiment.

FIG. 2 is a block diagram of system 200 to generate a SLF look-up table trained to extract panned sources, according to an embodiment. The SLF is a system that has been trained to extract a target source with a given level distribution and specified spatial parameters, from a mix which includes backgrounds with a given level distribution and spatial parameters.

System 200 includes target source parameter database 201, target source distribution sampler 202, transform 203, parameter detector 204, re-indexer 205, target SNR selector 206, trained SLF look-up table 207, background parameter database 208, background distribution sampler 209 and transform 210. The distribution samplers 202, 209, and transforms 203, 210, are shown as separate blocks in FIG. 2, but in practice the samplers 202, 209 and transforms 203, 210 can be combined into single modules (e.g., software modules) that operate on both the target source and background databases 201, 208.

The goal of the training procedure implemented by system 200 is to create a Bayesian model which, given a two channel input (e.g., L/R stereo input), predicts the relative fraction of energy belonging to the target source for each STFT domain bin or tile. To help achieve this goal, four parameters are used, which are detectable for two channel inputs in the STFT domain.

A first parameter is b, which represents a roughly-octave frequency subband. This parameter is obtained by a trivial mapping from a given frequency bin ω to the subband b to which it belongs. Examples of subband boundaries are given below.

A second parameter is the detected "panning" for each (@,t) tile, which is defined as:

$$\Theta(\omega,t)=\arctan(|X_R(\omega,t)|/|X_L(\omega,t)|),  \quad [7]$$

where "full left" is 0 and "full right" is π/2.

A third parameter is the detected "phase difference" for each tile. This is defined as:

$$\varphi(\omega,t)=\text{angle}(X_L(\omega,t)/X_R(\omega,t)), \quad [8]$$

which ranges from −π to π, with 0 meaning the detected phase is the same in both channels.

The fourth parameter is the detected "level" for each tile, defined as:

$$U(\omega,t)=10*\log_{10}(|X_R(\omega,t)|^2+|X_L(\omega,t)|^2), \quad [9]$$

which is just the "Pythagorean" magnitude of the two channels. It may be thought of as a sort of mono magnitude spectrogram.

Each frequency bin @ is understood to represent a particular frequency. However, data may also be grouped within subbands, which are collections of consecutive bins, where each frequency bin @ belongs to a subband. Grouping data within subbands is particularly useful for certain estimation tasks performed in the system. In an embodiment, octave subbands or approximately octave subbands are used, though other subband definitions may be used. Some examples of banding include defining band edges as follows, where values are listed in Hz:

[0, 400, 800, 1600, 3200, 6400, 13200, 24000],
[0, 375, 750, 1500, 3000, 6000, 12000, 24000], and
[0, 375, 750, 1500, 2625, 4125, 6375, 10125, 15375, 24000].

Note that if the "octave" definition is strictly followed, there could be an infinite number of such bands with the lowest band approaching infinitesimal width, so some choice is required to allow a finite number of subbands. In an embodiment, the lowest band is selected to be equal in size to the second band, though other conventions may be used in other embodiments. Herein, the terms "subband" and "band" may be used interchangeably.

To understand how to build a Bayesian system based on these four parameters, first recall Bayes' rule:

$$p(A|B)=p(B|A)p(A)/p(B). \quad [10]$$

In this case, the goal of the training process is to allow estimation of the distribution on the SNR for each spectrogram tile, given some observations. The observations b, Θ, φ, U were described above. Bayes' rule is given by:

$$p(SNR|b,\Theta,\varphi,U)=p(b,\Theta,\varphi,U|SNR)p(SNR)/p(b,\Theta,\varphi,U). \quad [11]$$

Now the goal is to train a Bayesian system which can produce all the quantities on the right side of Equation [11], such that the quantity on the left side of Equation [11] can be estimated. To do so, p (SNR) is estimated by considering level distributions on the target source on the background.

The conditional probability of p (b,Θ,φ,U|SNR) is estimated from distributions on the parameters (Θ,φ,U) in each frequency band b when mixing target and backgrounds at various SNRs. The procedure to generate this data involves generating many samples of data from databases 201, 208, for the target source and backgrounds, respectively, by sampling from their known or assumed spatial and level distributions using distribution samplers 202, 209. Transforms 203, 210 create STFT domain values with the properties of the samples.

Recall that the target source is assumed to have a specific panning parameter, so the training procedure described here explicitly specifies the panning parameter of the target source we wish to later extract. The example embodiments described herein assume that the target source has $\Theta_1=\pi/4$, which corresponds to a center-panned source. When generating training data, it is assumed that a random phase relationship exists between the target and backgrounds as noted above. Practically, this may be implemented by setting one phase value to zero and the other to various samples on the unit circle.

To create training data, frequency domain representations output by transform modules 203, 210, are added together (as shown in the signal model 100 of FIG. 1) to create a combined frequency domain representation. It is noted that there will be a very large number of combinations of target and background data items when performing Bayesian training, yet this very large number of combinations will have a much smaller number of equally-quantized target-to-background ratios.

To efficiently exploit this reality, the training process separately creates a set of uniformly sampled data for each of the following: target-to-background SNRs (0 to 37 dB, though larger ranges may be chosen), phase differences between target and backgrounds (0 to 2π), background Θ (0 to π/2), and background φ magnitude (0 to π). For all possible combinations of this data, the training process calculates the detected (Θ, φ, U) values and stores them in storeThetaHat, storePhiHat and storeUdBHat, respectively. Note that such calculations still have not considered the specific spatial and level distributions on each of the target and backgrounds. They are merely lookup tables mapping from all potential combinations of relevant input attributes to detected Θ, φ and U. Using these tables will increase efficiency later on in the training process.

Next, the specific spatial and level data for the target and backgrounds are incorporated. Recall that the goal is to obtain p (b,Θ,φ,U|SNR). Practically, the distribution on each variable of (Θ,φ,U) can be represented by a quantized probability density function (pdf), and SNR may also be quantized. In an embodiment, quantization of 51 levels for φ magnitude (0 to π), 51 levels for Θ (0 to π/2), 1 dB increments for U (example range of 0 to 127 dB), and 1 dB increments for DNR (example range of −40 dB to +60 dB) are used. Given such quantization, the information p (b,Θ, φ,U|SNR) may be stored in a multidimensional array "storePopularity" of size as follows: 7 bands, by 101 trained SNRs (−40 to 60), by 51 Θ bins, by 51 φ bins, by 128 dB levels (e.g., 0 to 127). For each item, the value stored in the array then represents the probability (or, similarly, "popularity") of a particular combination, relative to other combinations in the array. For example, array element (4, 49, 26, 26, 90) represents how "popular," it was to have, for frequency band 4 and a +8 dB DNR ($49^{th}$ value), a detected Θ value of π/4 ($26^{th}$ value), a φ magnitude value of π/2 ($26^{th}$ value) and a level U of 89 dB ($90^{th}$ value).

To obtain p (b,Θ,φ,U|SNR), the training process exhaustively (or via sampling) cycles over all possible combinations of spatial and level data for target and source. At this time, when a particular SNR, phase difference, background Θ and background φ is observed in the training data, the data previously stored in storeThetaHat, storePhiHat and storeUdBHat is used to look up the resulting Θ, φ, and U, respectively, to reduce training calculations. This lookup may also be called "parameter detection" and is performed by block 204 of FIG. 2. Importantly, the popularity of each such combination, as indicated by the values of the spatial and level distributions on target and backgrounds, are also used; they weight the contribution to the storePopularity array and in so doing, incorporate p (SNR) as desired. By cycling over all such combinations and noting their popularity, the above described storePopularity array is created. This array may be sparse or noisy, so it shall be smoothed using techniques familiar to those skilled in the art. An example technique would be smoothing over one or more dimensions of the table.

At this stage, the data needed for Bayesian analysis is obtained, but not provided in the lookup table or function format desired. The final step in the training process is to obtain a usable p (SNR|b,Θ,φ,U) from the data p (b,Θ,φ, U|SNR) p (SNR) in storePopularity, which is of size: 7 bands, by 101 trained SNRs (−40 to 60), by 51 Θ bins, by 51 φ bins, by 128 dB levels (e.g., 0 to 128). To understand how this corresponds to p (b,Θ,φ,U|SNR) p (SNR), recall that p (b,Θ,φ,U|SNR) p (SNR) may be equally represented as p (b,Θ,φ,U,SNR), or equivalently p (b,SNR,Θ,φ,U). The five indices are the same as the indices in storePopularity.

This re-indexing or remapping is done by blocks 205 and 206 in FIG. 2. Keep in mind that the desired p (SNR|b,Θ, φ,U) is not a set of single values but a set of distributions on SNR given some detected (Θ,φ,U) for each frequency band b. To keep the representation size manageable, a decision is made as to how to concisely describe these distributions; typical ways of doing so include taking a mean, median or other parameters. Given the needs of the practical applications for which this system is designed, in an embodiment the $25^{th}$ and $50^{th}$ percentile of each SNR distribution is used.

To obtain p (SNR|b,Θ,φ,U), the training process works to perform re-indexing (block 205) and target SNR selection (block 206). The basic goal is to assemble and characterize all SNR data from storePopularity which corresponds to a given detected (Θ,φ,U) triplet in a frequency band b. Since the frequency bands are treated as independent, it is equivalent to consider the goal to be doing each of N separate exercises to find p (SNR|Θ,φ,U) for each of N frequency bands. Block 205 performs this task. It cycles over every frequency band, and over every sampled distribution level for the following variables: detected Θ, detected φ, detected level. For each such value, a buffer is created from storePopularity, consisting of all of the SNRs and how popular they were given the particular combination of detected Θ, φ and U values. More specifically, the buffer is a subset of storePopularity as follows: storePopularitySmoothed (band index, (all data), Θ index, φ index, U index). Next block 206 analyzes the buffer of values, and, in an embodiment, detects and records the $25^{th}$ percentile and $50^{th}$ percentile values in the Trained SLF lookup table (207). Specifically, these values are recorded in new arrays, respectively percentile25SNRvalues and percentile50SNRvalues, each of which is indexed by (band index, detected Θ index, detected φ index, detected U index), which is indeed the representation sought for p (SNR|b,Θ,φ,U).

Because of potential sparseness of training data, some buffers from which the percentile SNRs are calculated may have too few data points from which to yield reliable percentile SNR values. To address this, two example techniques can be used, though others may be used. One technique is to share data from adjacent frequency bands, Θ values, φ values or U values (with preference to frequency band and U level sharing) before calculating percentile SNRs. The other technique is to calculate percentile SNRs even if from sparse data, then if they appear unstable, replace or smooth the percentile SNR values with SNR values from adjacent U values, or if necessary, frequency bands.

At this stage, the reindexing is complete and application of the trained system is described. The system has a reindexed table, such that the indices to the table represent quantized values of Θ, φ, and U, and an index b to the frequency band in question. To use such a table to obtain the softmask value, a function quantizes the input Θ, φ and U values to, respectively, 51, 51 and 128 levels. The conversion from detected Θ, φ and U values to their indices is trivial and follows the same quantization used when making the quantized distributions above. The function accesses the values of the table corresponding to these quantized index levels (as well as the index for frequency band b corresponding to the frequency bin ω in question).

Note that, although percentile25SNRvalues and percentile50SNRvalues are in this case obtained from a table with specific indices, the SNR values may in practice be given by more general functions which take in arbitrary (not necessarily quantized) values of Θ, φ, U and b. In practice, a function which seeks to obtain softmask values from Θ, φ, U and b, need not access a table to output the softmask value. It could directly calculate a softmask value by using curves or general functions, (including trained neural networks) which approximate and or interpolate the values in the table. It is easy to see from inspection of FIG. 3 (a representation of the $25^{th}$ percentile SNR system) that curves could be fit to the data represented in the table. In an embodiment using a table, the table is understood not to be a limiting method for obtaining the softmask values, but rather a recommended efficient method for doing so. Functions, such as those derived from least squares curve fitting, or neural networks approximating or interpolating the table may be constructed, using techniques familiar to those skilled in the art.

Figure 3:
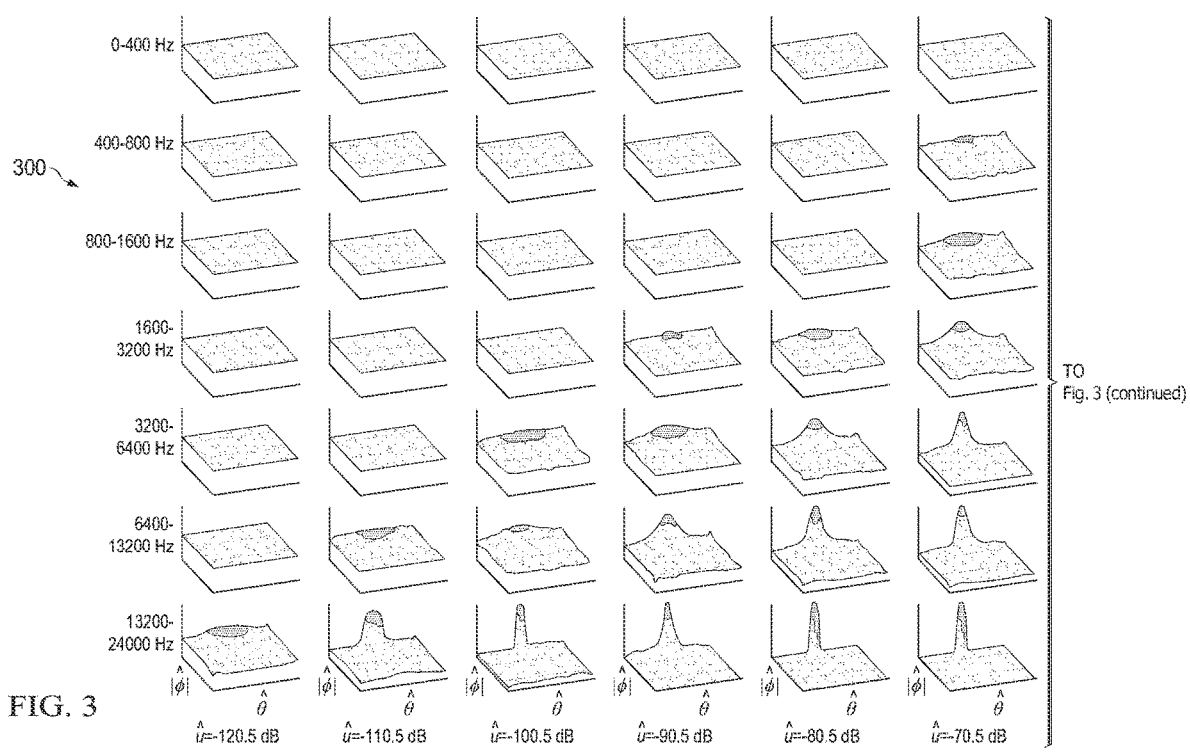
FIG. 3 is a visual depiction of the inputs and outputs of a SLF look-up table trained to extract panned sources, in accordance with an embodiment.
Figure 3:
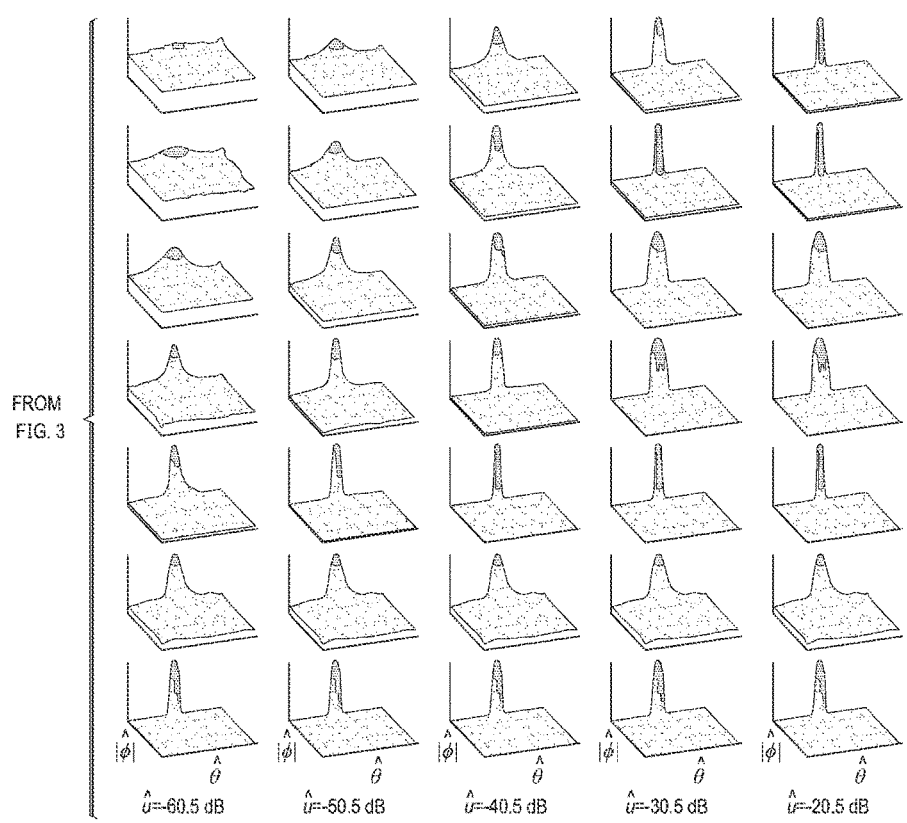

FIG. 3 is a visual depiction of the inputs and outputs of a SLF look-up table trained to extract panned sources, in accordance with an embodiment. More particularly, FIG. 3 shows a visual representation of a trained $25^{th}$ percentile four dimensional (4D) SLF look-up table for a center panned target source, as described in reference to FIG. 2. The SLF look-up table is large but also repetitive. Techniques that are familiar to those skilled in the art can be used to reduce the lookup time and memory required for storing the information in this table (e.g., entropy coding), or as mentioned above, for converting the information in the table into continuous functions.

As mentioned above, the visual representation in FIG. 3 is 4D. The four input variables are the modified left-right $\Theta$ and in-out $\varphi$ axes of each subplot and the vertical (subband b) and horizontal (level U) subplot indices. Note that, for practical reasons, the horizontal subplot dimensions (level U) does not depict all levels stored in the SLF look-up table; doing so would require 128 left-right subplots as 1 dB increments are used over a range of 128 dB in the table. In practice, finer or coarser increments could be used for higher accuracy or more lookup efficiency, respectively. When viewing FIG. 3, it is noted that there are many "not-displayed" subplots from left to right.

The output variable of the SLF look-up table is a softmask value between 0 and 1 inclusive, and is shown on the vertical axis of each subplot. The softmask value represents the fraction of the corresponding input STFT that shall be passed to the output. Since there is one (four dimensional) input per STFT tile, there is also one output per STFT tile. The result of applying the SLF table/function is an STFT-sized representation consisting of values between 0 and 1.

As noted above, softmask values generated by percentile25SNRvalues or percentile50SNRvalues can be used, though other percentiles may be used. Generally speaking, using percentile25SNRvalues leads to a source separation solution which balances between including some backgrounds and incurring some artifacts in the source estimate. Using percentile50SNRvalues leads to a solution which has fewer artifacts but also more backgrounds. The application of softmask parameters is shown in block 404 of FIG. 4.

In an embodiment, the softmask values and or signal values are smoothed over time and frequency using techniques familiar to those skilled in the art. Assuming a 4096 point FFT, a smoothing versus frequency can be used that uses the smoother [0.17 0.33 1.0 0.33 0.17]/sum ([0.17 0.33 1.00.33 0.17]). For higher or lower FFT sizes some reasonable scaling of the smoothing range and coefficients should be performed. Assuming 1024 sample hop size, a smoother versus time of approximately [0.1 0.55 1.0 0.55 0.1]/sum ([0.1 0.55 1.0 0.55 0.1]) can be used. If hops size or frame length is changed, the smoothing can be appropriately adjusted.

Example Applications

Figure 4:
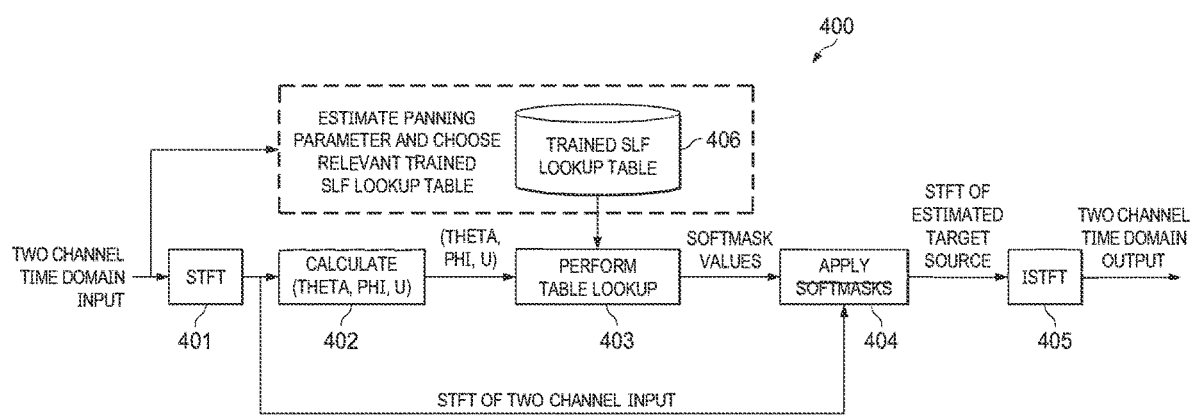
FIG. 4 is a block diagram of a system for detection and extraction of spatially-identifiable subband audio sources from two-channel mixes using a SLF trained to extract panned sources, according to an embodiment.

FIG. 4 is a block diagram of a system 400 for detection and extraction of spatially-identifiable subband audio sources from two-channel mixes using a SLF, according to an embodiment. System 400 includes transform 401, parameter calculator 402, table look-up 403, softmask applicator 404 and inverse transform 405. Table look-up 403 operates on database 406 which stores the SLF look-up table trained to detect panned sources, as described in reference to FIG. 2. For this example application, we assume that the target source to be extracted either has a known panning parameter, or that detection of such a parameter is performed using any number of techniques known to those skilled in the art. One example technique to detect a panning parameter is to peak pick from a level-weighted histogram on theta values.

Referring to FIG. 4, transform 401 is applied to a two-channel input signal (e.g., stereo mix signal). In an embodiment, the system 400 uses STFT parameters, including window type and hop size, which are known to be relatively optimal for source separation problems to those skilled in the art. However, other STFT parameters may be used. From a STFT representation, parameter calculator 402 calculates values for the parameters $(\Theta,\varphi,U)$ for each octave subband b. These values are used by table look-up 403 to perform a table lookup on the SLF look-up table stored in database 406. The table look-up generates a percentile SNR (e.g., the $25^{th}$ percentile) for each STFT tile or bin. From the SNR, system 400 calculates a fraction of the STFT input to be output as a Bayesian estimate. For example, if the estimated percentile SNR is 0 dB, the fraction of input passed would be 0.5 or 50% because the target source and background are estimated to have the same level U. The general formula follows the assumption of a Wiener filter, and is: fraction of input=10^(SNR/20)/(10^(SNR/20)+1). Next, softmask applicator 404 multiplies the input STFT for each channel by this fractional value between 0 and 1 for each STFT tile. Inverse transform 405 then inverts the STFT representation to obtain a two channel time domain signal representing the estimated target source.

Although the foregoing example embodiments use STFT time-frequency representations (e.g., tiles), any suitable time-frequency representation can be used.

Although the example source separation application described above uses an SLF look-up table, other embodiments can use an SLF function instead of a look-up table.

Example Processes

Figure 5:
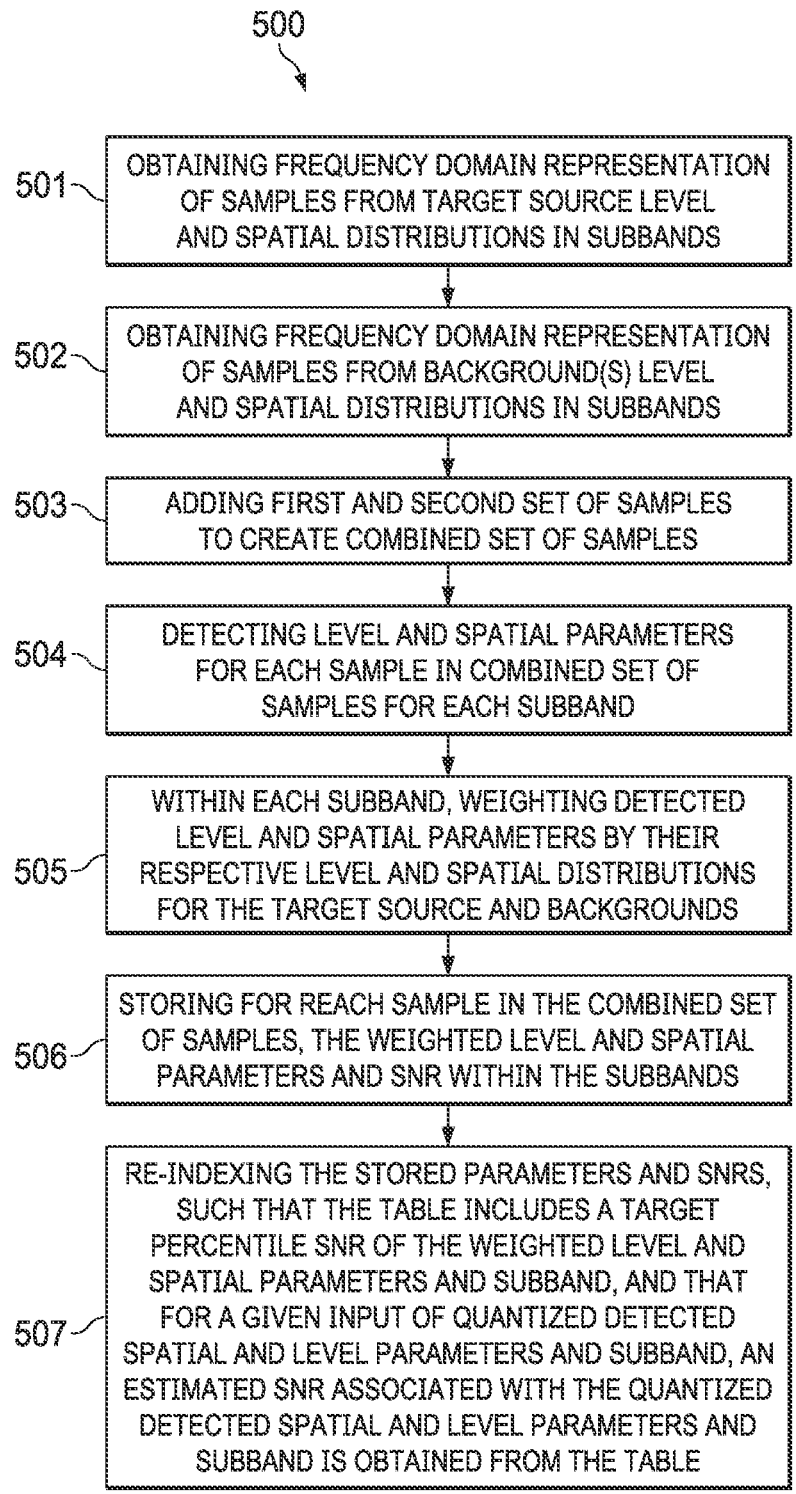
FIG. 5 is a flow diagram of a process to generate a SLF look-up table trained to extract panned sources, in accordance with an embodiment.

FIG. 5 is a flow diagram of process 500 to generate a SLF look-up table trained to extract panned sources, in accordance with an embodiment. Process 500 can be implemented by, for example, the device architecture 700, described in reference to FIG. 7.

Process 500 begins by obtaining frequency domain representations of samples from target source level and spatial distributions in subbands (501), obtaining frequency domain representations of samples from background level(s) and spatial distributions (502), and adding the first and second sets of samples to create a combined set of samples (503), as described in reference to FIG. 2.

Process 500 continues by detecting level and spatial parameters for each sample in the combined set of samples for each subband (504), and within each subband, weighting the detected level and spatial parameters by their respective level and spatial distributions for the target source and background(s) (505), as described in reference to FIG. 2.

Process 500 continues by storing for each sample in the combined set of samples, the weighted level and spatial parameters and SNR with the subbands in a table (506), as described in reference to FIGS. 2 and 3.

Process 500 continues by re-indexing the stored parameters and SNRS, such that the table includes a target percentile SNR of the weighted level and spatial parameters and subband, and that for a given input of quantized detected spatial and level parameters and subband, an estimated SNR associated with the quantized detected spatial and level parameters and subbands is obtained from the table (507), as described in reference to FIGS. 2 and 3. The SLF look-table is then stored (in a database for use in a source separation application, such as described in reference to FIGS. 4 and 6.

Figure 6:
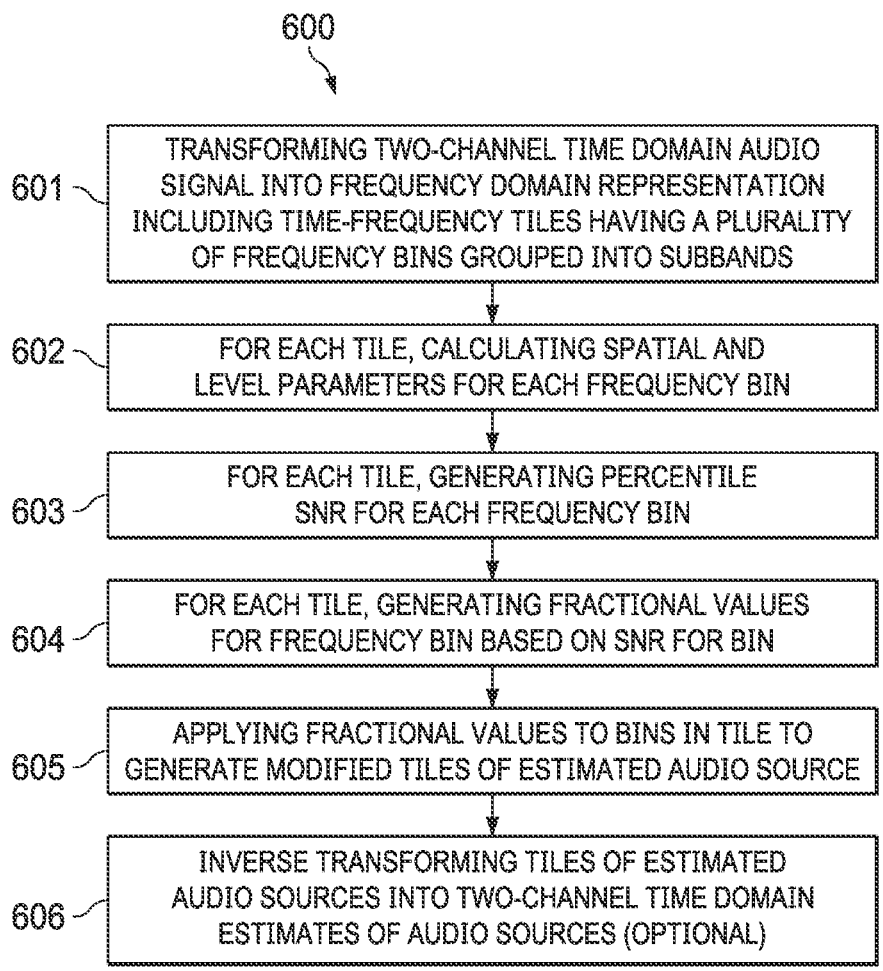
FIG. 6 is a flow diagram of a process of detection and extraction of spatially-identifiable subband audio sources from two-channel mixes using a SLF trained to extract panned sources, in accordance with an embodiment.

FIG. 6 is a flow diagram of process 600 of detection and extraction of spatially-identifiable subband audio sources from two-channel mixes using a SLF trained to detect panned sources, in accordance with an embodiment. Process 600 can be implemented by, for example, the device architecture 700, described in reference to FIG. 7.

Process 600 can begin by transforming a two-channel time domain audio signal into a frequency domain representation including time-frequency tiles having a plurality of frequency bins grouped into subbands (601). For example, an STFT can be used to create an STFT representation of each channel of the two-channel time domain audio signal.

Process 600 continues by calculating spatial and level parameters for each frequency bin (602). For example, the parameters $(\Theta, \varphi, U)$ can be computed using Equations [7]-[9].

Process 600 continues by generating, for each tile, a percentile SNR for each frequency bin in the tile (603), generating a fractional value for the frequency bin based on the SNR for the frequency bin (604), and applying the fractional values to their respective frequency bins in the tile to generate a modified tile of an estimated audio source (605), as described in reference to FIG. 4. The SLF look-up table/function is trained to detect panned sources, as described in reference to FIGS. 2 and 5. The fractional values described above are also referred to herein as softmask values and are real numbers between 0 and 1 inclusive, and represent the fraction of the corresponding input STFT that is passed to the output. The result of applying the SLF table/function is an STFT-sized representation consisting of values between 0 and 1. In an embodiment, the softmask values and/or SNR values are smoothed over time and frequency using techniques familiar to those skilled in the art Process 600 continues by optionally inverse transforming the time-frequency tile of the estimated target audio source into two-channel time domain estimate of the target audio source (606), as described in reference to FIG. 4. Note that some embodiments may utilize the time-frequency tile of the estimated audio source in the frequency domain, and other embodiments may utilize the two-channel time domain estimate of the estimated audio source.

Example Device Architecture

Figure 7:
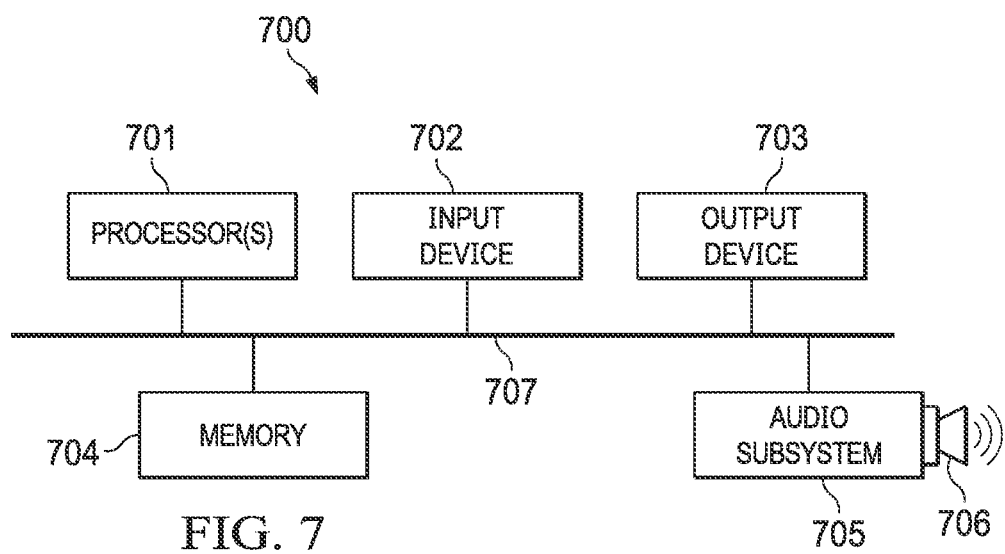
FIG. 7 is a block diagram of a device architecture for implementing the systems and processes described in reference to FIGS. 1-6, according to an embodiment The same reference symbol used in various drawings indicates like elements.

FIG. 7 is a block diagram of a device architecture 700 for implementing the systems and processes described in reference to FIGS. 1-6, according to an embodiment Device architecture 700 can be used in any computer or electronic device that is capable of performing the mathematical calculations described above.

In the example shown, device architecture 700 includes one or more processors 701 (e.g., CPUs, DSP chips, ASICs), one or more input devices 702 (e.g., keyboard, mouse, touch surface), one or more output devices (e.g., an LED/LCD display), memory 704 (e.g., RAM, ROM, Flash) and audio subsystem 706 (e.g., media player, audio amplifier and supporting circuitry) coupled to loudspeaker 706. Each of these components are coupled to one or more busses 707 (e.g., system, power, peripheral, etc.). In an embodiment, the features and processes described herein can be implemented as software instructions stored in memory 704, or any other computer-readable medium, and executed by one or more processors 701. Other architectures are also possible with more or fewer components, such as architectures that use a mix of software and hardware to implement the features and processes described here.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method comprising:
sampling, using one or more processors, a first spatial and level distribution of sound sources to obtain a first set of samples representing a target source;
sampling, using the one or more processors, a second spatial and level distribution of sound sources to obtain a second set of samples representing background sources;
obtaining, using the one or more processors, a frequency domain representation of the first set of samples in a plurality of frequency subbands;
obtaining, using the one or more processors, a frequency domain representation of the second set of samples in the plurality of frequency subbands;
pairwise adding, using the one or more processors, the frequency domain representations of the first and second sets of samples to create a plurality of training data sets;
detecting, using the one or more processors, respective parameter values for each of the training data sets for each frequency subband in the plurality of frequency subbands;
for each frequency subband of the plurality of frequency subbands, weighting, using the one or more processors, a contribution to a popularity array of each combination of the respective parameter values by the first and second spatial and level distributions;
storing, using the one or more processors, the popularity array and corresponding signal-to-noise ratio (SNR) values for the plurality of frequency subbands in a table, wherein each of the corresponding SNR values represents a level ratio of the target source to the background sources in a respective training data set; and
re-indexing, using the one or more processors, the table based on a Bayesian relationship between distributions of the respective parameter values and of the corresponding SNR values such that, for a given input set of parameter values, estimated SNR values associated with the given input set of parameter values for the plurality of frequency subbands are obtained from the re-indexed table via a lookup operation.

2. The method of claim 1, further comprising:
smoothing data in the popularity array over one or more dimensions of the table.

3. The method of claim 1, wherein the frequency domain representation is a short-time Fourier transform (STFT) domain representation.

4. The method of claim 1, wherein spatial parameters represented by the respective parameter values include panning and a phase difference between two channels of a mixed audio signal corresponding to the plurality of training data sets.

5. The method of claim 1, wherein the target source is amplitude panned using a constant power law.

6. A method comprising:
transforming, using one or more processors, one or more frames of a two-channel time domain audio signal into a time-frequency domain representation including a plurality of time-frequency tiles, wherein the time-frequency domain representation includes a plurality of frequency bins grouped into a plurality of subbands;
for each tile of the time-frequency domain representation:
calculating, using the one or more processors, a respective set of spatial parameter values and a respective level;
generating, using the one or more processors and a lookup table, a respective percentile signal-to-noise ratio (SNR) value for each frequency subband of the plurality of frequency subbands, wherein the lookup table is trained based on a Bayesian relationship between distributions of parameter values and corresponding SNR values such that, in response to a given input set of parameter values, the lookup table returns estimated SNR values associated with the given input set of parameter values for the plurality of frequency subbands, and wherein each of the corresponding SNR values represents a level ratio of the target source to background sources in a respective frequency subband of the plurality of frequency subbands;
generating, using the one or more processors, a softmask of fractional values based on the respective percentile SNR values, with each fractional value representing an audio portion of a corresponding subband attributed to the target source in a respective tile of the time-frequency domain representation; and
applying, using the one or more processors, the softmask of fractional values for to the plurality of frequency subbands in the respective tile to generate a modified time-frequency tile corresponding to the target source.

7. The method of claim 6, further comprising:
transforming, using the one or more processors, the modified time-frequency tile into a corresponding time domain audio signal.

8. The method of claim 6, wherein the transforming comprises applying a short-time frequency transform (STFT) to the two-channel time domain audio signal.

9. The method of claim 6, wherein the plurality of frequency bins is grouped to form octave subbands or approximately octave subbands.

10. An apparatus comprising:
one or more processors; and
a memory storing instructions that when executed by the one or more processors, cause the apparatus to perform the method of claim 1.

* * * * *

UNITED STATES PATENT AND TRADEMARK OFFICE
CERTIFICATE OF CORRECTION

PATENT NO. : 12,367,887 B2
APPLICATION NO. : 18/009651
DATED : July 22, 2025
INVENTOR(S) : Aaron Steven Master It is certified that error appears in the above-identified patent and that said Letters Patent is hereby corrected as shown below:

In the Claims

Column 14, Line 12, Claim 6, after "values", delete "for"

Signed and Sealed this
Twenty-third Day of December, 2025

John A. Squires
*Director of the United States Patent and Trademark Office*